(12) United States Patent
Zeiber

(10) Patent No.: US 8,047,577 B2
(45) Date of Patent: Nov. 1, 2011

(54) HOSE COUPLING

(75) Inventor: Dennis Zeiber, Erie, PA (US)

(73) Assignee: All-American Hose LLC, Union City, PA (US)

( * ) Notice: Subject to any disclaimer, the term of this patent is extended or adjusted under 35 U.S.C. 154(b) by 115 days.

(21) Appl. No.: 12/258,772

(22) Filed: Oct. 27, 2008

(65) Prior Publication Data
US 2010/0102551 A1    Apr. 29, 2010

(51) Int. Cl.
*F16L 33/00* (2006.01)
(52) U.S. Cl. ........ 285/242; 285/253; 285/419; 285/373; 29/525.02
(58) Field of Classification Search ................. 285/242, 285/253, 252, 419, 373; 29/525.02, 525.01, 29/525

See application file for complete search history.

(56) References Cited

U.S. PATENT DOCUMENTS

| | | | | |
|---|---|---|---|---|
| 1,300,956 | A | * | 4/1919 | Greve ........................... 285/253 |
| 1,745,295 | A | * | 1/1930 | Greve ........................... 285/253 |
| 1,843,123 | A | * | 2/1932 | Croslen ........................ 285/253 |
| 1,852,962 | A | * | 4/1932 | Farr ............................. 285/253 |
| 1,887,877 | A | * | 11/1932 | Shaffer ........................ 285/253 |
| 3,073,628 | A | | 1/1963 | Cline et al. |
| 3,249,371 | A | * | 5/1966 | Peterman .................... 285/253 |
| 3,332,447 | A | | 7/1967 | Holmgren |
| 3,457,359 | A | | 7/1969 | Soucy |
| 3,472,536 | A | * | 10/1969 | Ingram ........................ 285/253 |
| 3,687,491 | A | * | 8/1972 | Marshall ...................... 285/242 |
| 4,229,029 | A | * | 10/1980 | Boyer et al. ................. 285/242 |
| 4,467,837 | A | | 8/1984 | Baker |
| 4,486,036 | A | | 12/1984 | Storke et al. |
| 4,564,222 | A | * | 1/1986 | Loker et al. ................. 29/525 |
| 4,593,942 | A | | 6/1986 | Loker |
| 4,784,202 | A | * | 11/1988 | White ........................ 285/419 |
| 4,940,261 | A | | 7/1990 | Vine |
| 4,952,262 | A | | 8/1990 | Washkewicz et al. |
| 5,297,822 | A | | 3/1994 | Sanders et al. |
| 5,413,147 | A | | 5/1995 | Moreiras et al. |
| 5,593,527 | A | | 1/1997 | Schomaker et al. |

(Continued)

FOREIGN PATENT DOCUMENTS

GB            1057623            8/1962

(Continued)

OTHER PUBLICATIONS www.victaulic.com, Pages From, Jul. 22, 2008.

(Continued)

*Primary Examiner* — David E Bochna
(74) *Attorney, Agent, or Firm* — Woodling, Krost and Rust

(57) ABSTRACT

A hose coupling employs a tailpiece, a sleeve and collar to prevent the hose to be removed from the coupling. The tailpiece includes an exterior having: a first sinusoidally shaped (in cross-section), partially diamond shaped knurled contour, and, a cylindrically shaped interior. The sleeve includes an interior second sinusoidally shaped contour reciprocal to the first undulating contour of the tailpiece. The sleeve includes first and second halves each having two sets of fingers which interengage the fingers of the other half. A hose is disposed between the sleeve and the tailpiece and the hose includes a grounding wire which engages the collar or the sleeve. The collar includes first and second halves and each of the halves of the collar interengage the sleeve urging the sleeve against the hose compressing the hose against the contour of the tail piece.

26 Claims, 14 Drawing Sheets

U.S. PATENT DOCUMENTS

| | | |
|---|---|---|
| 5,603,357 A | 2/1997 | Schomaker et al. |
| 5,971,007 A | 10/1999 | Harcourt et al. |
| 6,102,450 A | 8/2000 | Harcourt |
| 6,581,977 B1 * | 6/2003 | Dole et al. ............ 285/419 |
| 6,659,510 B1 * | 12/2003 | Ikegami et al. ......... 285/253 |
| 6,978,805 B2 | 12/2005 | D'Amico |
| 6,984,351 B2 | 1/2006 | Harcourt et al. |
| 7,198,476 B2 | 4/2007 | Harcourt et al. |
| 7,712,792 B2 * | 5/2010 | Burke et al. ............. 285/253 |
| 2002/0170727 A1 | 11/2002 | Holland et al. |
| 2003/0111128 A1 | 6/2003 | Hannigan et al. |
| 2004/0261876 A1 | 12/2004 | Warren et al. |
| 2008/0145579 A1 | 6/2008 | Nguyen et al. |

FOREIGN PATENT DOCUMENTS

| | | |
|---|---|---|
| GB | 1156433 | 2/1968 |
| GB | 0916712.3 SR | 1/2010 |

OTHER PUBLICATIONS

Military Spec Photograph of Device, Circa 1998.

* cited by examiner

HOSE COUPLING

FIELD OF THE INVENTION

This invention is in the field of hose couplings.

BACKGROUND OF THE INVENTION

U.S. Pat. No. 4,940,261 to Sommer-Vine states in the Abstract that: "[t]his invention relates to a pipe coupling and, in particular, to a Victaulic-type coupling which generally comprise a pair of half shells, together forming a sleeve which can be placed around adjacent flanged or grooved ends of a pair of pipes which have been located in co-axial end to end relationship for joining. The pipe coupling of the invention comprises a pair of discrete, substantially identical half shells which are engageable with one another to form a coupling sleeve. The half shells each include a hook formation on one end thereof which is interengageable with the hook formation of the other half shell, partly to secure the half shells to one another."

U.S. Pat. No. 5,297,822 to Sanders et al. discloses in the Abstract that: "[a] hose construction, coupling therefor and methods of making the same are provided, the hose construction comprising a tubular hose and a coupling secured to one end of the tubular hose, the inner peripheral surface of the tubular hose comprising an inner corrugated hose made of polymeric material and having inwardly convex projections with recesses therebetween and extending from one end of the tubular hose to the other end thereof, the coupling having an insert disposed in the one end of the tubular hose and being radially outwardly expanded into sealing relation with the inner corrugated hose, the insert having an outer peripheral surface defined by a plurality of outwardly convex projections with recesses therebetween, the projections of the insert being respectively received in the recesses of the inner hose and the projections of the inner hose being respectively received in the recesses of the insert whereby the interior of the tubular hose is substantially sealed to the interior of the coupling."

U.S. Pat. No. 5,413,147 to Moreiras et al. discloses at col. 2, Ins. 37 et seq. "[i]n accordance with the invention, a flexible hose comprises an inner corrugated tube of polymeric material impervious to the fluid to be conveyed through the hose, an intermediate layer of rubber material surrounding the inner corrugated tube, a braided layer of fiber reinforcement material, and an outer layer of rubber material surrounding the braided layer of fiber reinforcement. The corrugated tube has alternating radially outer ridges and radially outwardly opening grooves axially staggered in relation to alternating radially inner ridges and radially inwardly opening grooves with a void being left at the bottom of the radially outwardly opening grooves. The radially outer ridges of the inner corrugated tube preferably are flat for controlling the degree of penetration of the intermediate rubber layer into the radially outwardly opening grooves."

U.S. Pat. No. 4,593,942 to Loker states in the Abstract: "[a] coupling and method of coupling thin-walled/tubing and the like includes an inner member and an outer member in the form of a sleeve or band surrounding the inner member with the tubing therebetween. The inner member is provided with a pair of tubing grooves and a seal receiving groove between the two tubing grooves or at least between one groove and the tube receiving end of the coupling. By means of annular ridges, the tubing is forced into the tubing grooves, and by means of an annular ridge the tubing is pressed tightly against the seal in the seal receiving groove, thus forming a fluid-tight coupling member."

U.S. Pat. No. 4,486,036 to Storke et al states in the Abstract that: "[a] coupling and method of coupling thin-wall hose/tubing and the like includes an inner member, a sleeve surrounding the inner member and the tubing therebetween. The inner member is provided with a pair of tubing grooves and a seal material between the grooves. By means of compression rings or annular ridges the tubing is forced into the tubing grooves and stretched across the seal, thus forming a fluid-tight coupling member."

It is desirable, therefore, for a hose coupling to retain the hose at high pressure. A hose coupling which is capable of handling high pressure due to long pumping distances is required. For instance, in military applications fluid (which may be fuel) must be pumped long distances from a source to a destination. Longer transport distances (up to 660 feet) increase pump discharge pressures which may be up to 750 psig. Longer transport distances increase the demands on the pumping equipment, the length of the hose, and the number of couplings used to join the hoses together. It is common to run hose lines as long as 660 feet in length. High pressures have heretofore caused difficulties in that large stresses have been applied to hose at pinch points within the couplings. Linear part lines in hose couplings cause particularly prominent problems with leakage as the pinch points perforate the hose. Prior art hose couplings have linear part lines which create linear pinch points. Prior art hose couplings also have sharp edges in the coupling parts which engage the hose and restrict the hose from stretching thus causing excessive tension to specific areas of the hose causing the fabric liner to split.

It is desirable, therefore, to provide a hose coupling which prevents tearing of the hose by allowing the hose to uniformly stretch. It is also desirable to provide a hose coupling device which avoids pinch points and part lines which cause leakage in the hose.

SUMMARY OF THE INVENTION

A hose coupling which prevents the extraction of hose from the coupling is disclosed and claimed. The hose may be a liquid transfer hose or it may be a general purpose fire hose. The hose comprises a tailpiece, a sleeve and a collar. The tailpiece includes an exterior, first sinusoidally shaped contour. The tailpiece also includes a cylindrically shaped interior through which fluid passes.

The exterior, first sinusoidally shaped contour of the tailpiece includes diamond shaped ed portions which grip the fire hose in engagement with the tailpiece as described herein. The sleeve includes an interior, second sinusoidally shaped contour reciprocal to the first sinusoidally shaped contour of the exterior of the tailpiece. The sleeve includes first and second halves and each half of the sleeve includes two sets of reciprocal fingers. Each set of reciprocal fingers of the first half of the sleeve engages and interfits a respective set of reciprocal fingers of the second half of the sleeve and the fingers are then interdigitated.

The exterior, sinusoidally shaped contour of the tailpiece includes first peaks and first valleys and the second interior, sinsusoidally shaped contour of the sleeve includes second peaks and second valleys. A hose which may be a fluid transport hose is disposed between the sleeve and the tailpiece. The first peaks of the tail piece interfit the second valleys of the sleeve and the first valleys of the tailpiece interfit the second peaks of the sleeve. The collar includes first and second halves each of which interengage the sleeve. The collar urges the sleeve against the hose which engages the first sinusoidally shaped contour of the exterior of the tailpiece and the diamond shaped knurled portions of the first sinusoidally shaped contour of the exterior of the tailpiece preventing extraction of the hose from the coupling. The knurl may be a straight circumferential knurl or it may assume any pattern shape.

The hose coupling joins two sections of hose together. The hose may be fire hose, fuel transfer hose or any hose of any type. The coupling retains the hose at a high pressure as compared to current couplings being manufactured. Also, the hose coupling has a Victaulic type end for joining two sections of hose. This joining method can be done in different ways, for example the Victaulic type connection just mentioned or it may be threaded.

The tailpiece of the invention includes a wave form (sinusoidal or other waveform) which prevents pinch points. Current couplings, for instance those which meet the "mil spec", create sharp edges causing tears and the like in the liners of the hose and in the fabric which supports those liners. "Mil spec" stands for military specification. Pinch points are also created in the prior art devices between various clamping components. Pinch points prevent the hose from stretching any allowable amount thus causing excessive tension in specific areas of the hose causing the fabric liner to split. The wave form used in the invention applies a constant force across the hose, thus reducing the stress on the fabric liner. The sleeve includes interlacing reciprocal fingers (interdigitated fingers) which prevent a straight line pinch point on the hose when the sleeves are clamped together and retained by the collars. A straight line pinch point can cause a leak path for fluid to egress. The latch assembly is made up of a pivot bar, bolts and washers. Bolts are partially threaded into the pivot bar which is placed in a retaining groove on one collar then swung into place on the other collar. Clamping can also be accomplished by threading the bolts directly into one of the collar halves. The function of the gasket is to prevent fluid egress into the coupling.

The gasket is installed into the groove on the tailpiece, then the hose is slid onto the tailpiece until it reaches the shoulder. The two sleeves are then placed on the outside of the hose. The collars are then placed with the parting line offset from the interlacing fingers of the sleeves. The assembly is then clamped together by means of equally applying torque to the bolts of the latch assembly.

A method for coupling hose is also disclosed and claimed. The method includes the steps of drawing hose over the exterior of the tailpiece. The tailpiece includes an undulating exterior surface and the inside diameter of the hose is slightly larger than the largest outside diameter of the hose gripping portion of the tailpiece. A shoulder which resides relatively close to the hose gripping end portion of the tailpiece has a larger diameter than the hose and therefore the hose is slid over the tailpiece until it abuts the shoulder. After the hose is in place over the tailpiece, the step of placing first and second sleeves on the outside of the hose is performed. Each sleeve half has interdigitated fingers for interengagement with fingers of the other half of the sleeve. Each sleeve includes undulating interior surfaces. Next, the first and second collar halves are placed over the first and second sleeves such that the joint between the first and second collars is rotationally offset from the interengagement of the interdigitated fingers of the sleeves. In practice, one of the sleeves will be positioned within one of the halves of the collars and it will rest on a surface and then the other collar will be placed on the top. Once positioned, the bolts pass through the collars and are secured in a pivot rod thus clamping the first and second sleeves to the hose. The bolts will then be tightened by torqueing, uniformly, the collars to each other urging them into forceful engagement with the sleeves compressing the hose between the undulating exterior surface of the tailpiece and the undulating interior surface of the sleeves. The method is particularly useful where the tailpiece includes diamond shaped knurled portions thereof.

The method includes steps of clamping and torqueing which are performed with pivot rods. The pivot rods reside in J-shaped slots in the exterior portions of the first and second collar halves. The pivot rods are threadedly interconnected with bolts secured within a respective one of the first and second collar halves. Using J-shaped slots together with the pivot rods enables rotation of one of the first and second coupling halves with respect to the other enabling removal of the hose from the coupling for reuse thereof.

DESCRIPTION OF THE INVENTION

Figure 1:
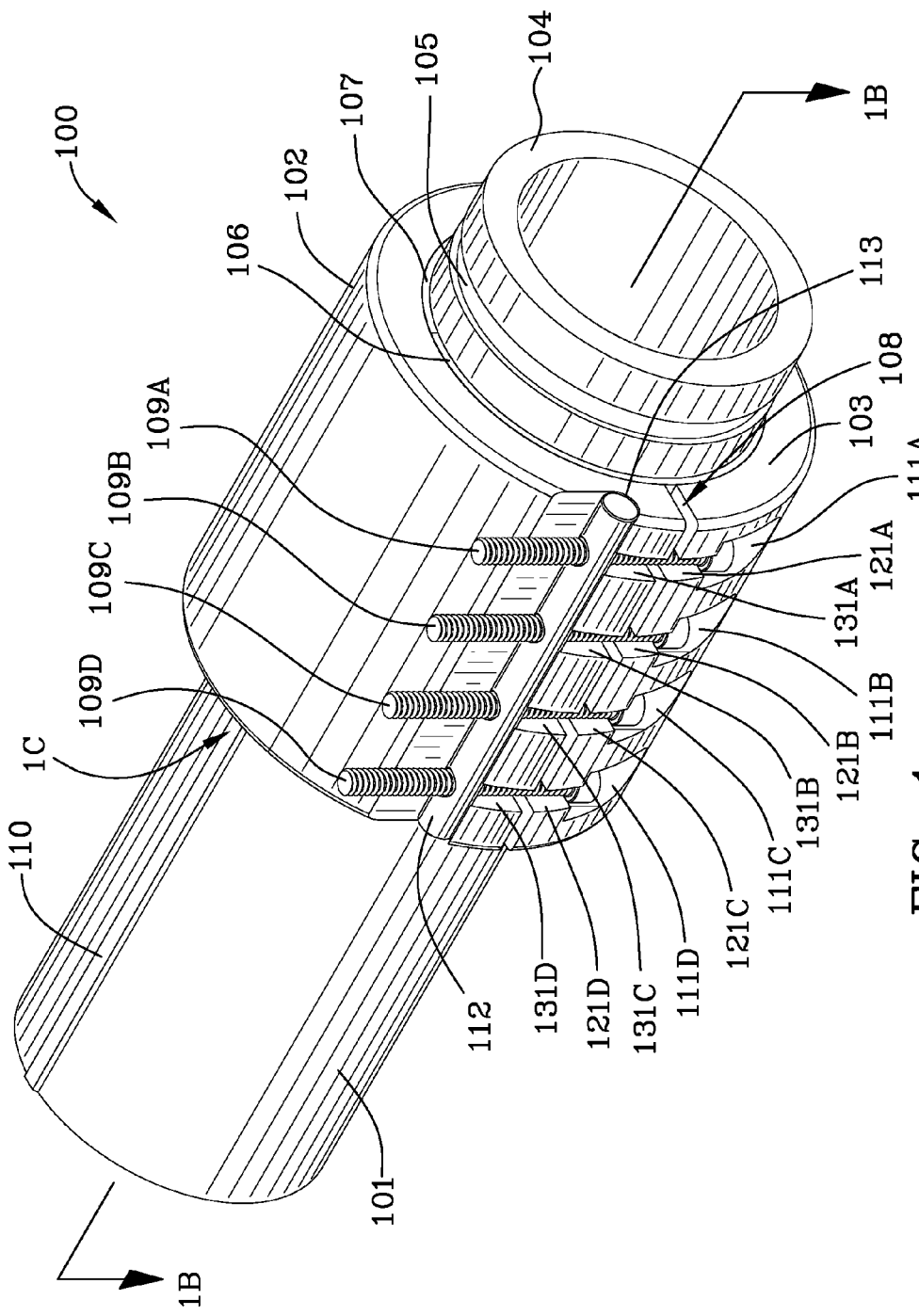
FIG. 1 is a front perspective view of the coupling and hose.

FIG. 1 is a front perspective view 100 of the coupling, sleeve halves 106, 107, tailpiece 104, hose 101, and collar 102, 103. The collar is made of two halves, a first collar half 102 and a second collar half 103. The collar halves and tailpiece may be made of any conductive metal such as aluminum or other non-corroding metal. The sleeves 106, 107 may be made of nylon or non-corroding metal such as aluminum. A grounding conductor 101M is illustrated as being slightly raised from the hose surface. The grounding conductor 101M electrically communicates any electrical potential through the conductor as well as all metal components in communication with the conductor 101M such as the collar half 102, tailpiece 104 and sleeve half 106.

Figure 1A:
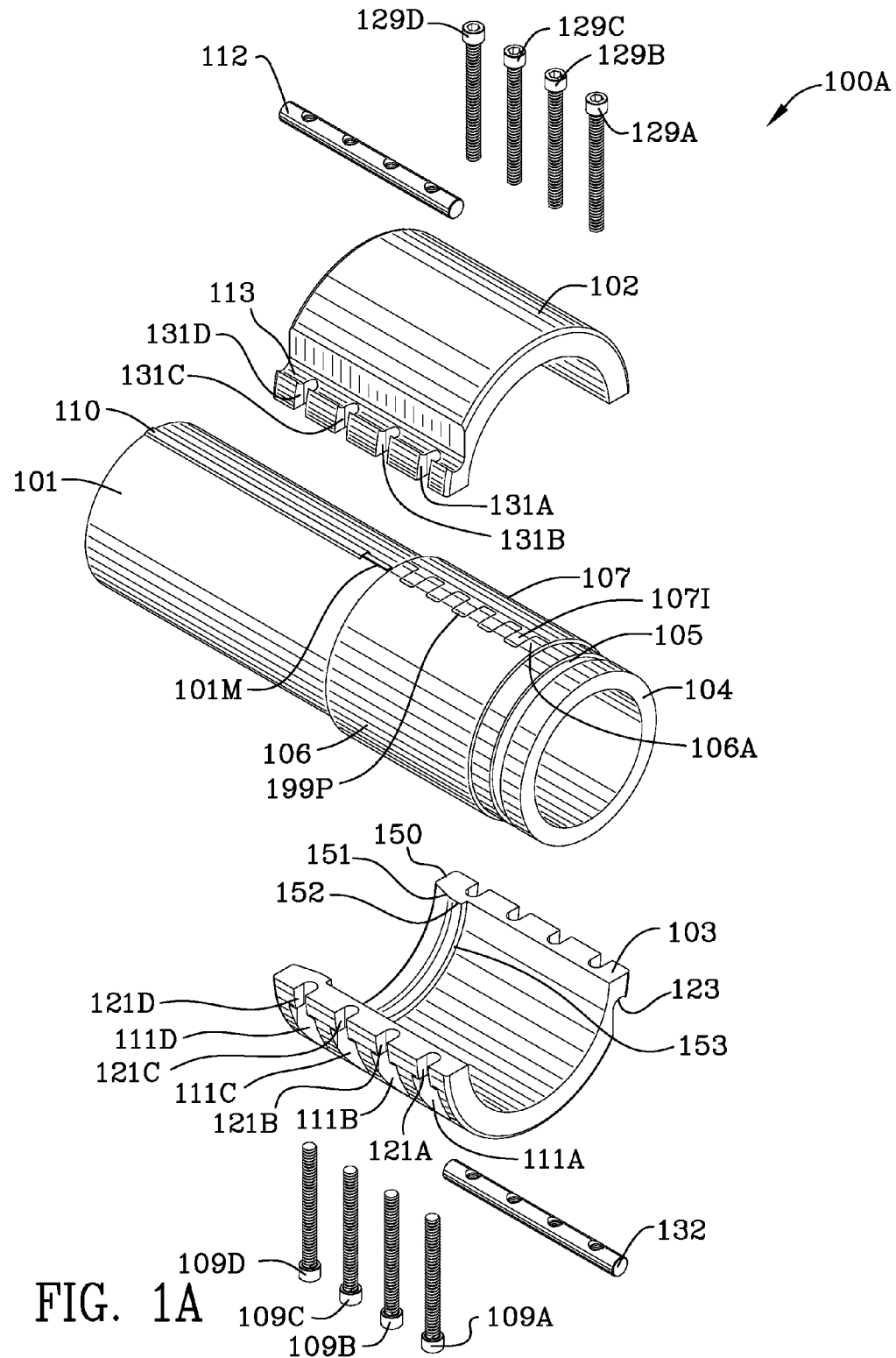
FIG. 1A is an exploded assembly view of the hose and coupling illustrating the hose, tailpiece and sleeve.
Figure 1B:
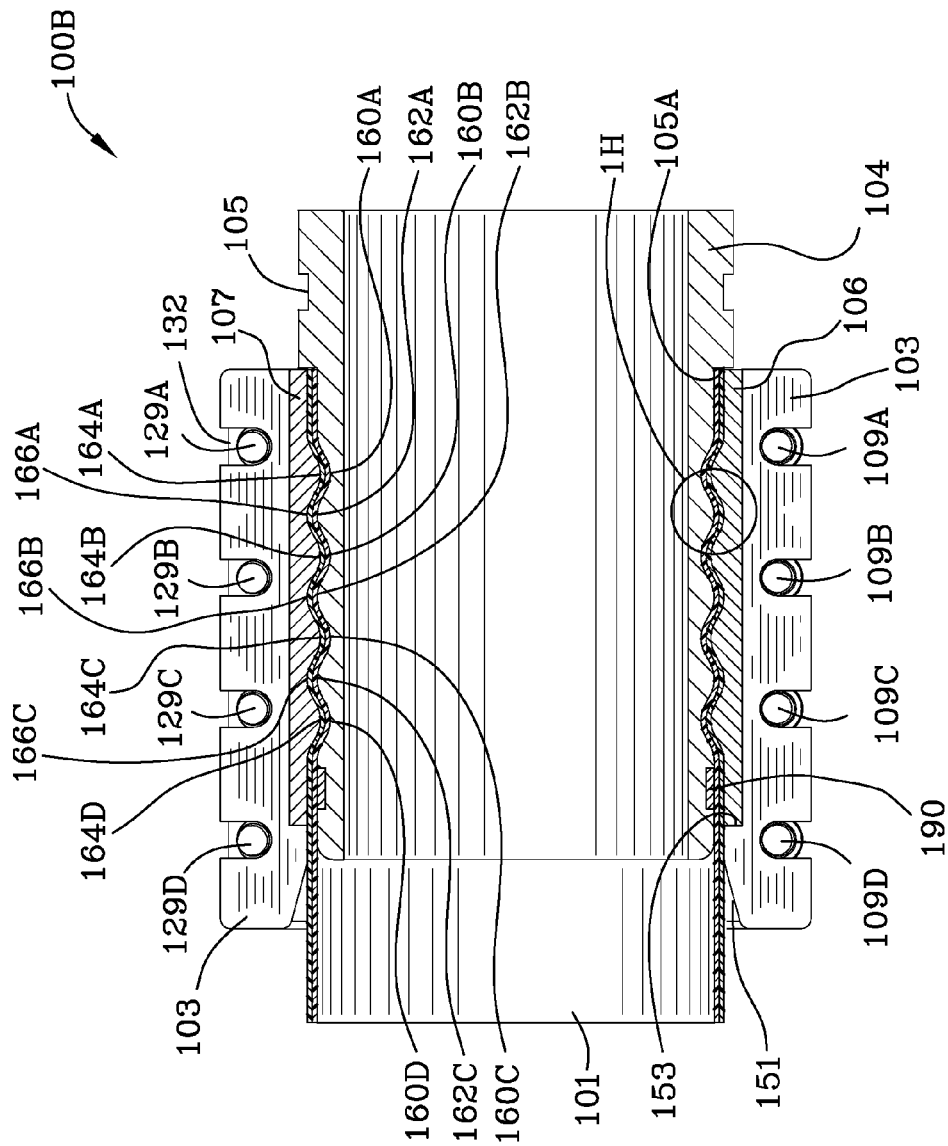
FIG. 1B is a cross-sectional view of the coupling and hose of FIG. 1 taken along the lines 1B-1B of FIG. 1.
Figure 1C:
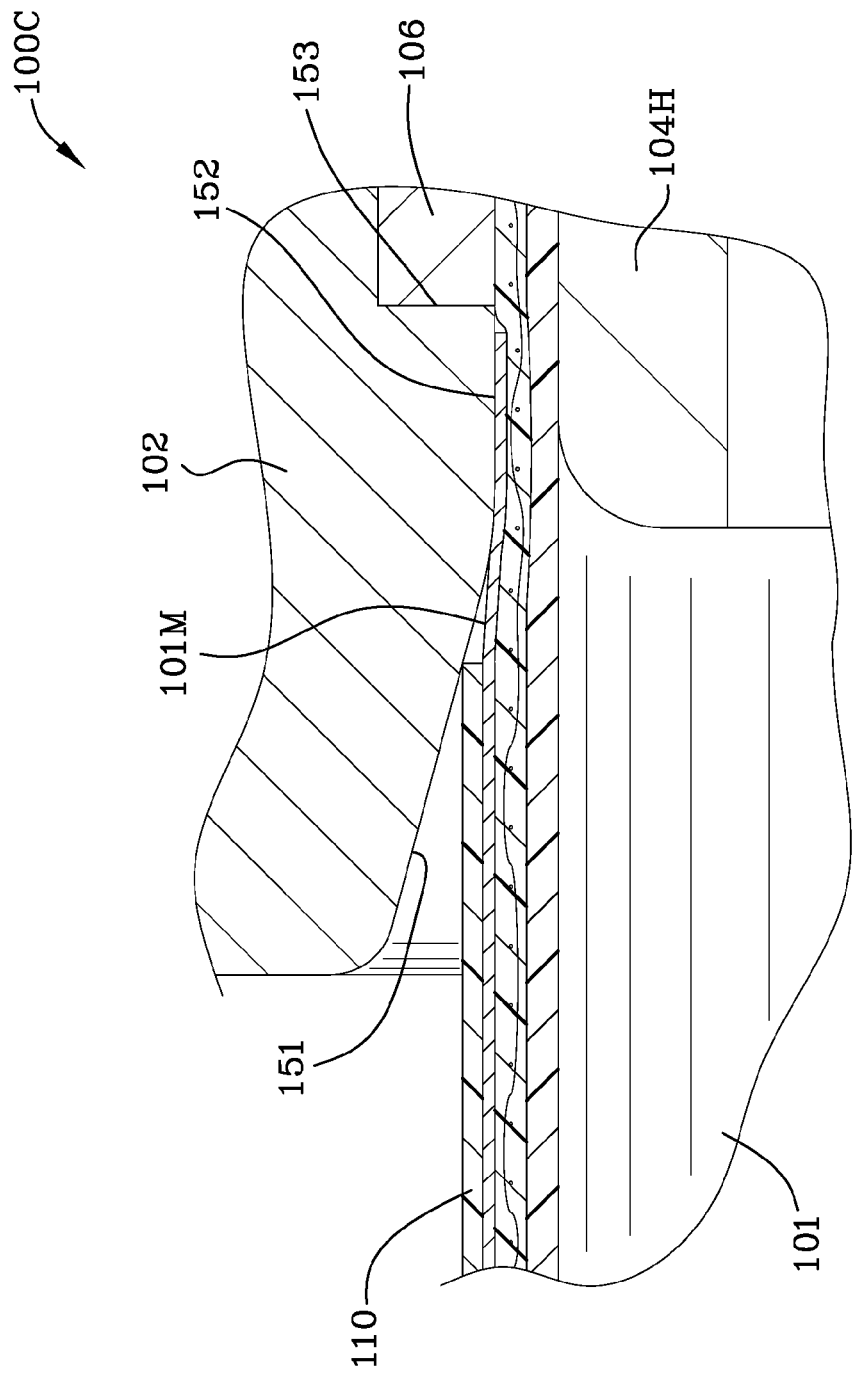
FIG. 1C is cross-sectional view taken of the area denoted by reference numeral 1C in FIG. 1.
Figure 2:
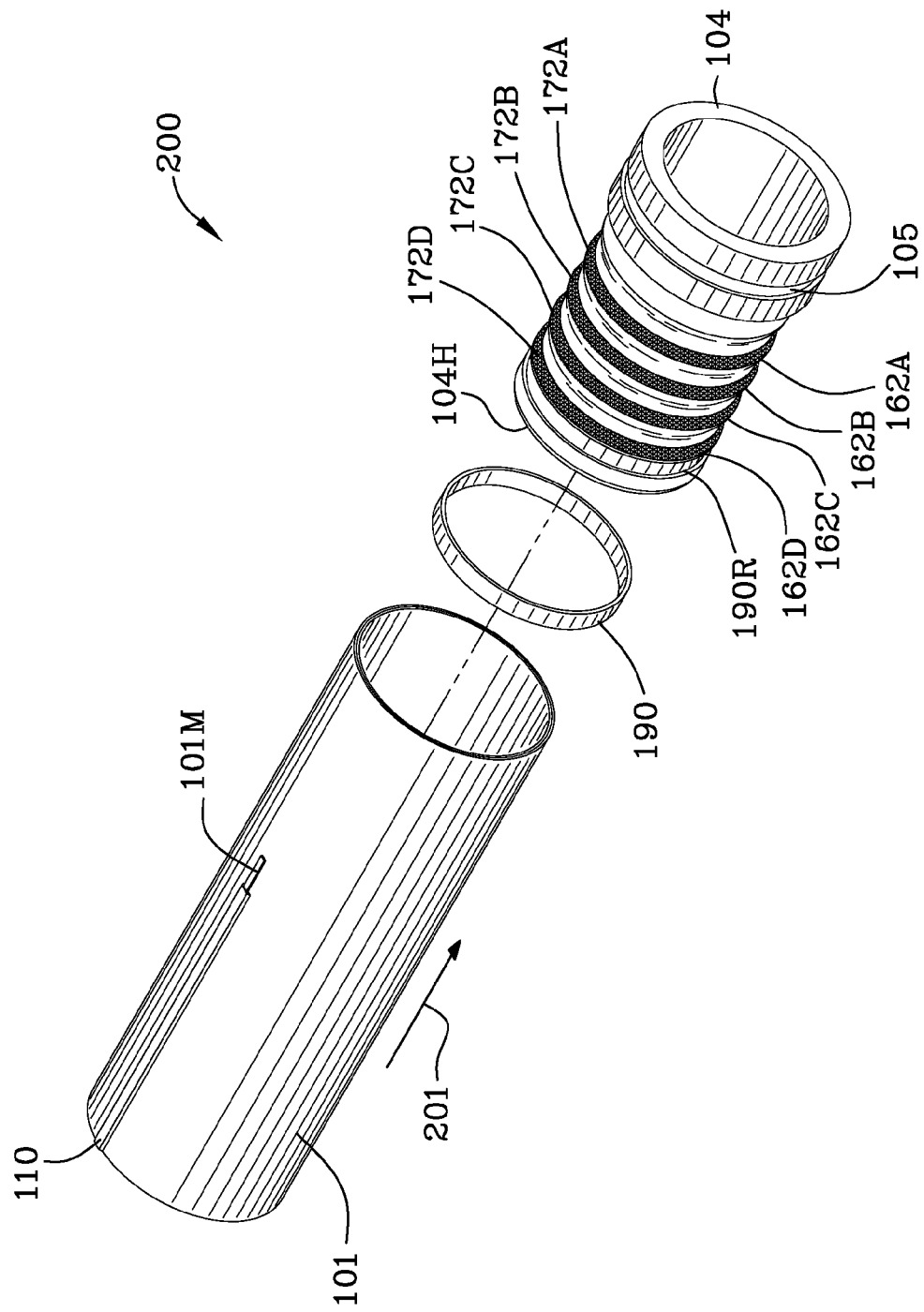
FIG. 2 is an exploded view of the hose positioned to be slid over the tail piece.

FIG. 1C is cross-sectional view 100C taken of the area denoted by reference numeral 1C in FIG. 1. The metal grounding conductor 101M is copper, aluminum or some other highly conductive metal and is illustrated in cross-section in engagement with collar 102. Collar 102 is, in turn, connected to a truck or is otherwise grounded. Metal grounding conductor 101M is shielded by sheath 110 as viewed in FIGS. 1, 1A, and 1C. Sheath 110 is part of the outer liner of the hose. Grounding conductor 101M is not necessary if the hose is not transporting dangerous fluids or material which might combust. Metal grounding conductor 102 engages land 152 of the end of collar 102. Slope 151 forms a mouth of the hose end 104H of the collars 102, 103. If desired, the metal grounding conductor may engage the sleeve half 106 by cutting back the sheath 110 over the conductor 101M thus, in effect, extending the length of the conductor. It will be noticed that the hose is manufactured such that the metal grounding conductor 101M does not extend to the end of the hose. In this way the hose may be cut to the correct length and then slid (pulled over or drawn over) the tailpiece 104. Referring to FIG. 2, which is an exploded view 200 of the hose positioned to be slid over (pulled over or drawn over) the tail piece 104, reference numeral 201 indicates the direction of the hose 101 as it is positioned over the tailpiece 104. Hose 101 as viewed in FIG. 2 may be cut or shortened to the desired length to ensure that the metal grounding conductor 101M will engage the collar 102.

It is desirable, therefore, to provide a hose 101 using Vectran fiber. The hose includes 3 layers: a liner (unnumbered), a jacket and a cover. The liner and cover 110 are polyurethane. The yarn used for the jacket is Vectran® which has high tensile strength and good strength retention for a wide range of temperatures. Vectran® is a registered trademark of Kuraray Co. Ltd. of Japan. In the circumferential (Weft) direction the pattern is preferably 2-4-2-4 and in the axial (Warp) direction the pattern is 4-2-4-2. Fiber diameter is measured as Denier 10500 in the Warp, 13500 in the Weft. See FIG. 1C wherein a weft pattern of 2-4-2-4 is shown. See FIG. 1H wherein a weft pattern of 2-1-2-1 is shown.

Referring to FIG. 1C, it will be noticed that the collar 102 is compressing the metal grounding conductor, the outer liner of the hose and the inner liner of the hose against the tailpiece 104. It will also be noticed that sleeve half 106 abuts interior shoulder 153 and sleeve half 106 also compresses the hose against the tailpiece 104.

Referring to FIG. 1, the coupling end includes a circumferential groove 105 for interconnection with another coupling device. Sleeve halves 106, 107 are interposed between the collars 102, 103 and form an exterior which is cylindrically shaped. See FIG. 1A which is an exploded assembly view 100A of the hose 101 and coupling illustrating the hose 101, tailpiece 104 and sleeve 106, 107. Gap 108 is between first 102 and second 103 coupling halves and is approximately 0.25 inches when the bolts are torqued. See FIG. 1. When gap 108 is, for example, 0.25 inches the sleeve halves 106, 107 are interengaged as illustrated in FIG. 1A. Bolts 109A, 109B, 109C and 109D interengage the second collar half 103 and are threaded into pivot rod 112. Pivot rod 112 is generally cylindrically shaped and is illustrated interengaging J-shaped seat 113 in the first upper collar half 103. FIG. 1A illustrates the bolts 129A, 129B, 129C and 129D which share the same configuration only on the opposite side of the hose coupling.

Referring to FIG. 1, openings or bolt head wells 111A, 111B, 111C and 111D and passageways 121A, 121B, 121C and 121D are illustrated in the second, bottom collar half 103. The first top collar half 102 includes bolt passageways 131A, 131B, 131C and 131D. Bolts 109A-D interengage the shoulders within the walls and when threaded in to the pivot rod 112 exert a clamping force on the sleeve 106, 107.

FIG. 1A is an exploded assembly view 100A of the hose 101 and coupling additionally illustrating the tailpiece 104 and sleeve 106, 107. The sleeve includes the first half 106 and the second half 107. First sleeve half 106 includes a set 106A of six interdigitated fingers and second sleeve half includes a set 107I of five interdigitated fingers. The interdigitated fingers 106A interfit with the interdigitated fingers 107I to form a non-linear part line 199P and thus the fingers are described herein as interdigitated. In this example a part line 199P having a general square wave shape is shown. Other shapes such as triangular wave shapes may be used. Further other non-linear shapes may be used. When the first sleeve half 106 and the second sleeve half 107 are brought together as shown in FIG. 1A they are within the collar halves 102, 103 and the collar urges them into the position illustrated (fully engaged) in FIG. 1A.

Still referring to FIG. 1A, second, bottom, collar 103 is illustrated together with shoulder 153. Land 152, slope 151 and hose end 150 of the collar are illustrated in the collar 103. Pivot rod 132 is cylindrically shaped and operates against J-shaped pivot rod seat 123. Shoulder 153 acts as a stop or seat for the first sleeve 106 and the second sleeve 107. If one side of the collar is secured by shorter threaded bolts which do not protrude significantly above the pivot rod, then the collar is may be rotated about the pivot rod. If the pivot feature is not desired then longer bolts may be used such as those illustrated by reference numerals 109A-D and 129A-D. The orientation of bolt passageways 131A-D, 121A-D, openings 111A-D and bolts 109A-D is viewed in FIG. 1A. Heads of bolts 109A-D and bolts 129A-D are viewed well in FIG. 1A and the seats for the bolts are viewed as part of FIG. 1A.

Figure 1D:
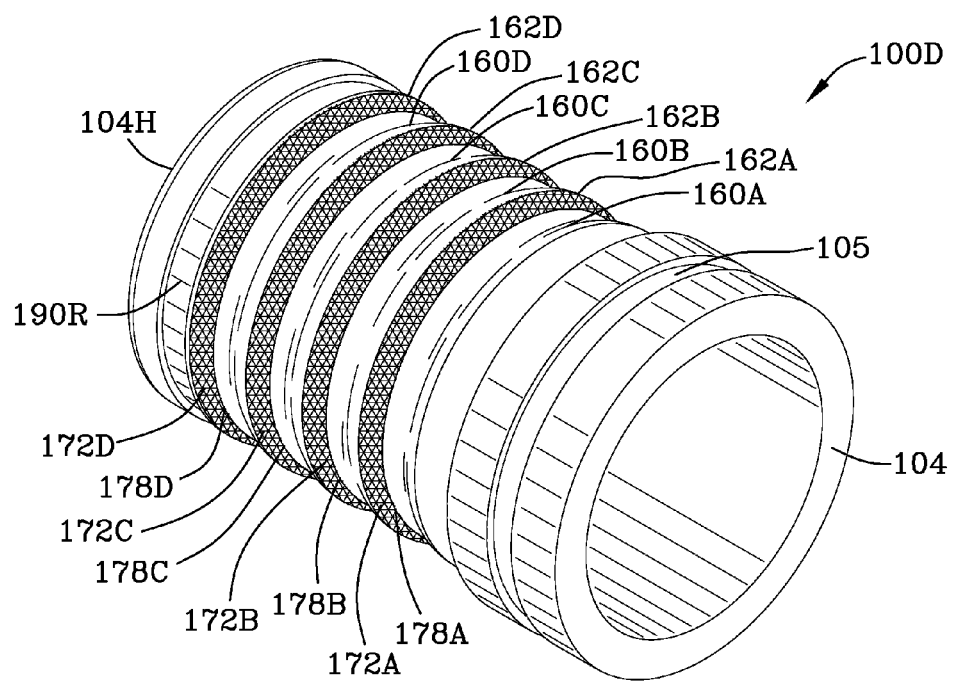
FIG. 1D is a perspective view of the tailpiece illustrating the exterior contour of the tailpiece and the diamond shaped knurl.
Figure 1E:
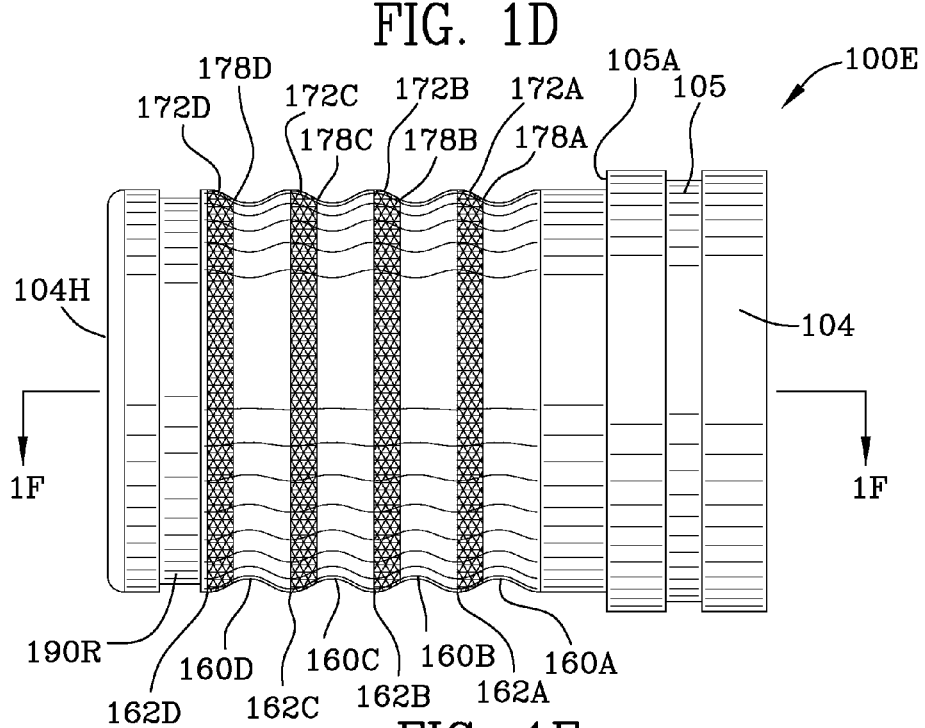
FIG. 1E is a front view of the tailpiece.

FIG. 1D is a perspective view 100D of the tailpiece 104 illustrating the sinusoidally shaped exterior contour of the tailpiece and four diamond shaped knurled surfaces 172A-D. Other knurl geometries may be machined into a portion of the exterior contour of the tailpiece. The diamond shaped knurled portions may have various thicknesses and use various pitches. FIG. 1E is a front view 100E of the tailpiece 104. Referring to both FIGS. 1D and 1E, it will be noticed that each of the diamond shaped knurled surfaces begins at the points on the surface contour of the tailpiece 104 denoted by 178A-D. Specifically, the position at which the diamond shaped knurled portion begins is equivalent approximately to the sin 30° and then the diamond shaped knurled portion is discontinued at approximately the sin 90° measured with a point of reference being at valley 160A with a vector rotating counterclockwise. Different sinusoidal waveforms may be used on the surfaces of the tailpiece and on the surfaces of the sleeve. For instance, different frequencies may be used. For example, the sinusoidally shaped exterior contour may be higher or lower in frequency. The sleeve would also include an interior surface which would be at the same higher or lower frequency of the tailpiece. Valleys 160A-D are low spots or minimums in the tailpiece with the interior of the tailpiece being a low reference. By minimum/valley it is meant that those points are a minimum radial distance from the centerline of the tailpiece. Minimums/valleys occur when sin 0° occurs measured with a point of reference being at valley 160A with a vector rotating counterclockwise.

Figure 1F:
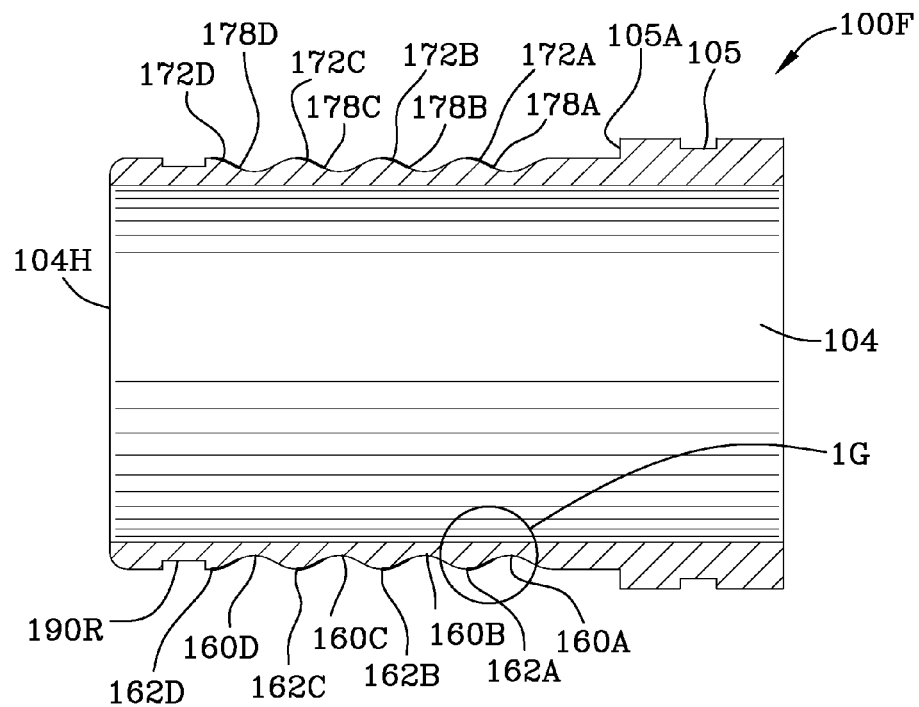
FIG. 1F is a cross-sectional view of the tailpiece taken along the lines 1F-1F of FIG. 1E.

Referring to FIG. 1F, a cross-sectional view 100F of the tailpiece 104 taken along the lines 1F-1F of FIG. 1E, valleys 160A-D and peaks (maximums) 162A-D are illustrated. By peaks and maximums, it is meant that those points are at a maximum radial distance from the centerline of the tailpiece. Peaks/maximums occur when sin 90° occurs measured with a point of reference beginning at valley 160A with a vector rotating clockwise. The diamond shaped knurled portions 172A-D of the surface appear as a thin line in FIG. 1F on the surface of the tailpiece. FIG. 1 illustrates shoulder 105A which restricts the hose as it is pulled (or drawn) over the tailpiece. The tailpiece includes an interior surface which is cylindrically shaped.

Peaks 162A-D and valleys 160A-D of the contour of the exterior surface of the tailpiece are illustrated in FIGS. 1D, 1E, and 1F. Reference numeral 104H denotes the hose side of the tailpiece. Recess 190R receives an elastomeric seal 190 (gasket) as illustrated in FIG. 2. FIG. 2 is an exploded view 200 of the hose positioned to be slid over (pulled over or drawn over) the tail piece 104. Reference numeral 201 indicates the direction of the hose 101 as it is positioned over the tailpiece 104. FIG. 1F illustrates the sinusoidal pattern or undulating pattern of the hose-gripping portion of the exterior surface of the tailpiece 104. The hose-gripping portion of the tailpiece 104 is the portion to the left of shoulder 105A when viewing FIG. 1F.

Figure 1G:
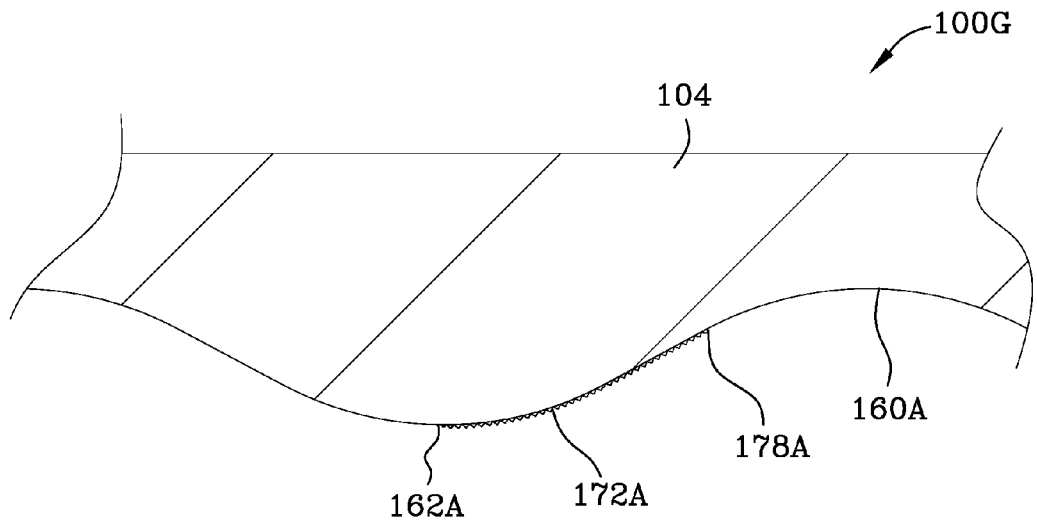
FIG. 1G is an enlarged portion of FIG. 1F illustrating the diamond shaped knurl on a portion of the contour/surface of the tailpiece.

FIG. 1G is an enlarged portion 100G of FIG. 1F illustrating the diamond shaped knurled portions 172A of the surface of the tailpiece 104. The diamond shaped knurled portions begin at approximately the point where sin 30° of a vector rotating counterclockwise is indicated. The diamond shaped knurled surfaces may be made to assume various surface characteristics, for example, the diamond shapes may vary dimensionally. Other shapes may be used instead of the diamond shapes.

Figure 1H:
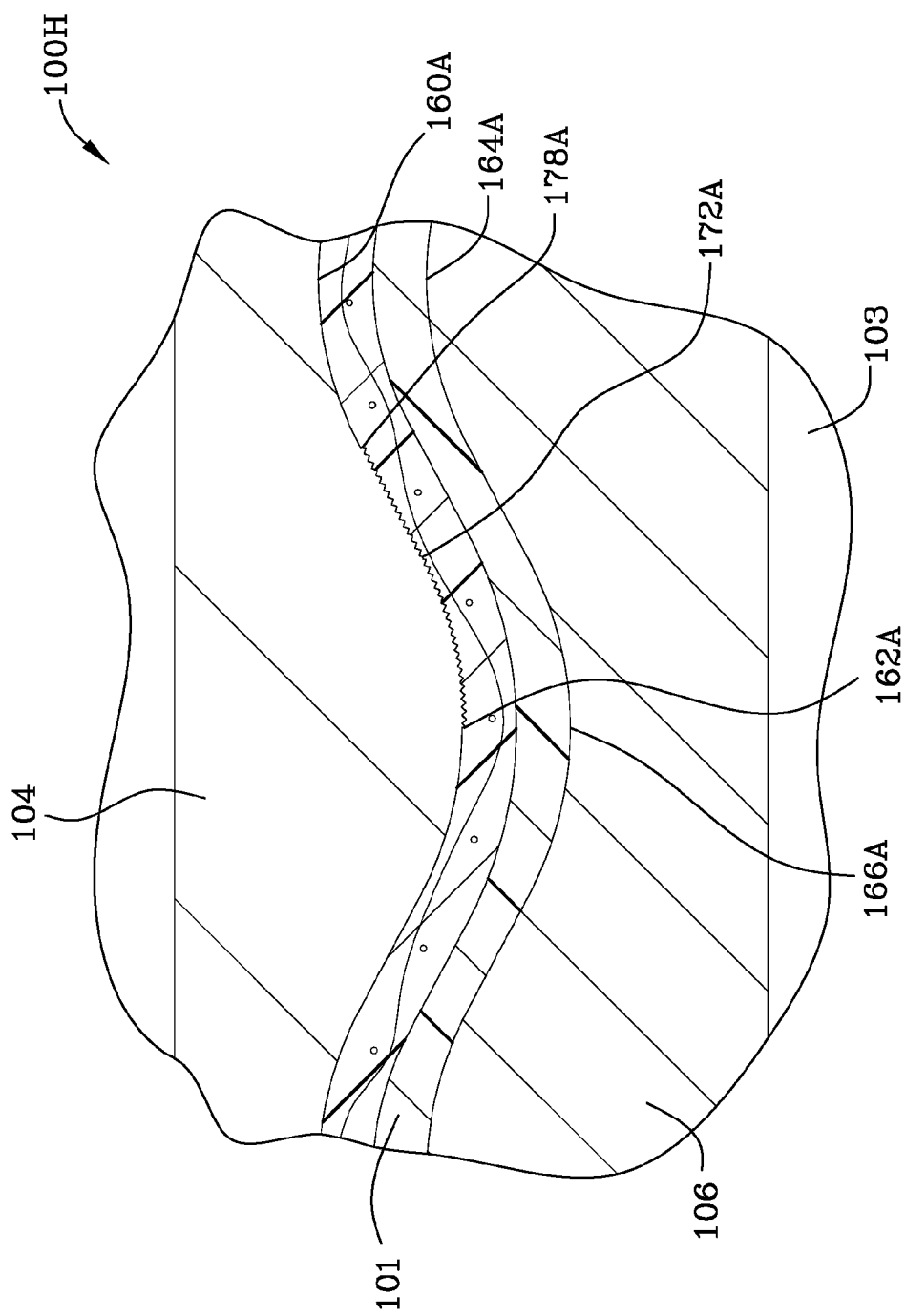
FIG. 1H is an enlargement of a portion of FIG. 1B illustrating the hose sandwiched between the tailpiece and one half of the sleeve.

FIG. 1H is an enlargement of a portion 100H of FIG. 1B illustrating the hose 101 compressed between the tailpiece 104 and the first half 106 of the sleeve. The diamond shaped knurled portion is indicated by reference numeral 172A. FIG. 1H illustrates that the diamond shaped knurl begins at a point 178A on the exterior surface of the tailpiece 104. The smooth contour of the undulating peaks and valleys of the tailpiece and the sleeve do not tear the hose 101 and its warp and weft fibers therein upon high pressurization of the hose and thus application of a large force in the leftward direction on the hose when viewing FIG. 1H. Additional the diamond shaped knurled surface 172A does not penetrate into hose 101 very deeply but retains the hose and its outer liner very well.

FIGS. 1B and 1H illustrate that valleys/minimums 160A-D of the tailpiece correspond to peaks/maximums 164A-D of the sleeve. The sleeve has as its "low" reference the exterior thereof such that the valleys/minimums occur toward the exterior of the sleeve and that the peaks/maximums occur toward the interior of the sleeve. Further, it can be seen from FIGS. 1B and 1H that valleys/minimums 166A-D of sleeve correspond to peaks/valleys 162A-D of the tailpiece.

FIG. 1B is a cross-sectional view 100B of the coupling and hose 101 of FIG. 1 taken along the lines 1B-1B of FIG. 1 illustrating the undulating contours of the tailpiece 104 and the sleeves 106, 107. Bolts 109A-D and their seats, bolts 129A-D and pivot rod 132, are viewed in relation to second collar half 103 in FIG. 1B.

Figure 2A:
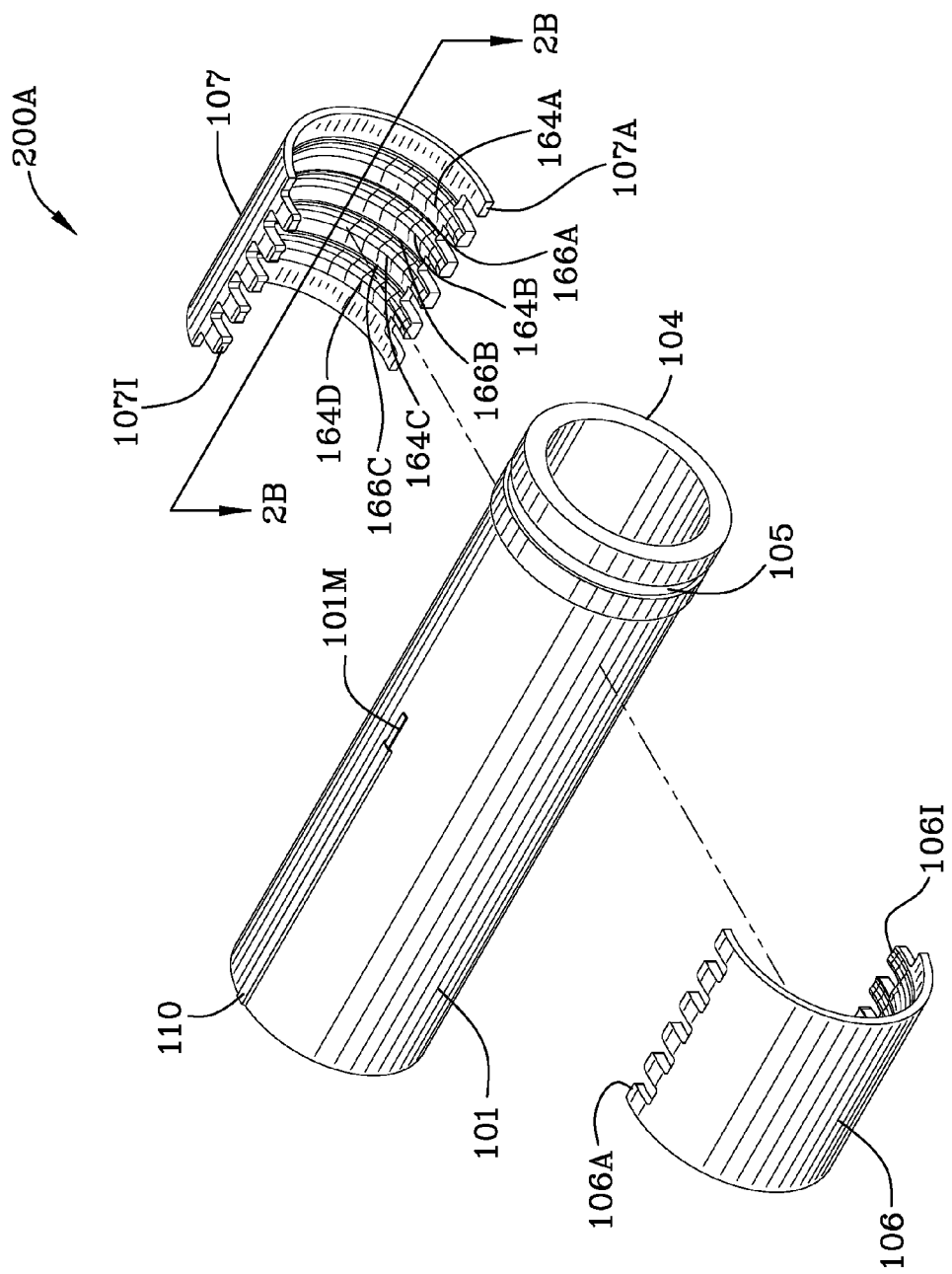
FIG. 2A is an exploded view of the hose residing over the tailpiece.
Figure 2B:
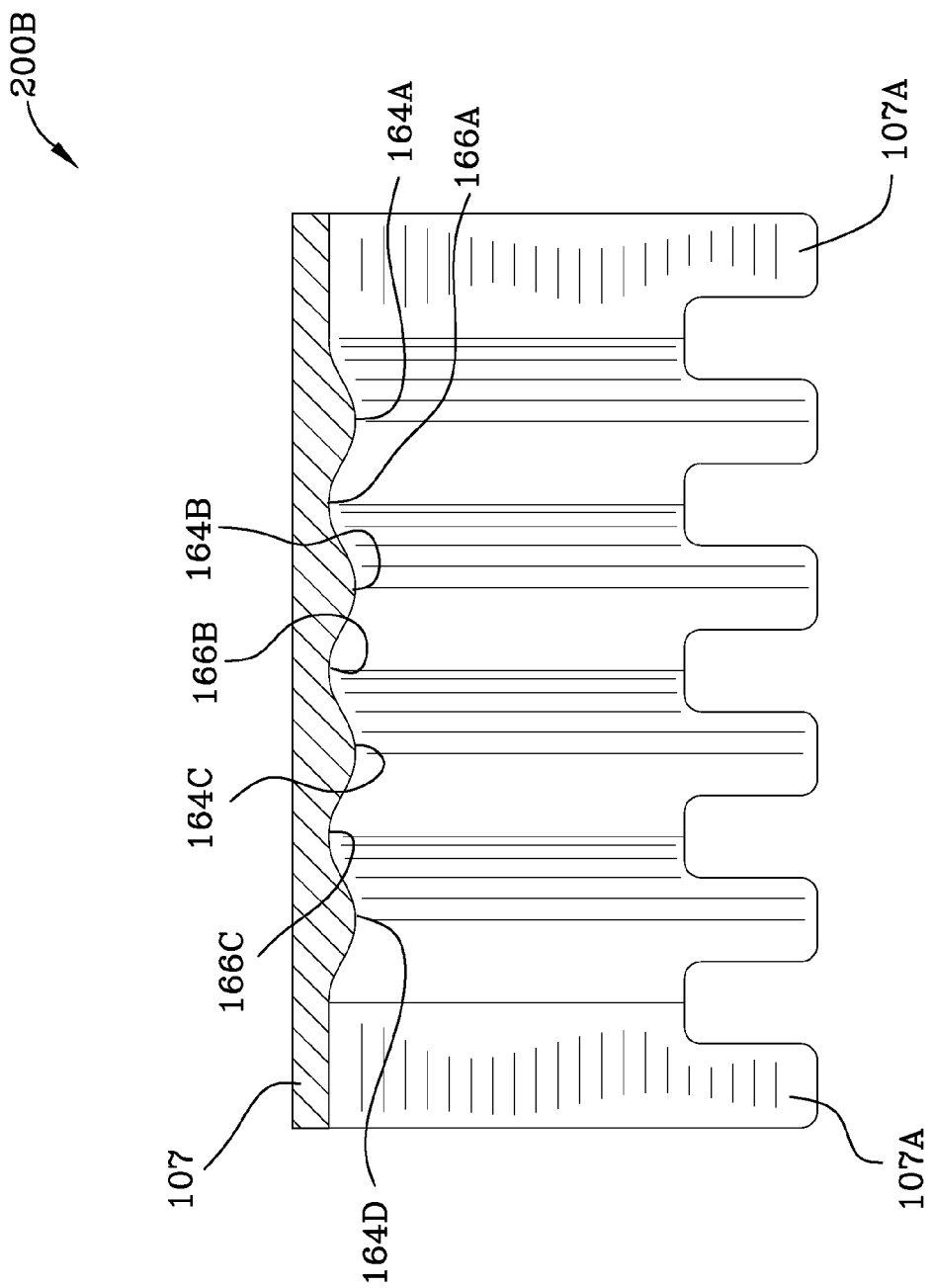
FIG. 2B is a cross-sectional view of one-half of the sleeve taken along the lines 2B-2B of FIG. 2A.

FIG. 2A is an exploded view 200A of the hose 101 residing over the tailpiece 104. As viewed in FIG. 2A, hose 101 is shown over the tailpiece and against the tailpiece shoulder 105A. Tailpiece shoulder 105A is illustrated in FIG. 1F. Maximums/peaks 164A-D are illustrated in sleeve half 107 as are minimums/valleys 166A-D. Set 107I of fingers and set 107A of fingers are illustrated for sleeve half 107 in FIG. 2A. Set 106I of fingers and set 106A of fingers are illustrated for sleeve half 106 in FIG. 2A. Each of the fingers is approximately 1 inch long and has a radii of approximately 0.125 inches. Different length fingers and differently shaped fingers may be used. The radii of the fingers occurs at the inner and outer portions of the fingers. FIG. 2B is a cross-sectional view 200B of one-half of the sleeve 107 taken along the lines 2B-2B of FIG. 2A illustrating the sinusoidal pattern of the interior portion of the sleeve. Again, minimums 166A-C and maximums 164A-D of the sine wave and fingers 107A are shown in FIG. 2B.

Referring to FIG. 1A, the sleeve comprises a first sleeve half 106 and a second sleeve half 107. Set 106A of six interdigitated fingers and set 107I of five interdigitated fingers are shown interleaved together. In this view sleeve halves 106 and 107 are shown forming a cylinder. As shown in FIG. 1A, the hose within the generally cylindrically-shaped sleeve conforms to the interior undulating waveform of the sleeve and the undulating waveform of the exterior of the tailpiece. In so doing, the length of the hose within the intermating undulating waveforms of the tailpiece and the sleeve is longer as the path along a sine wave is longer than the axis of the sine wave. Therefore, additional hose must be slid into the interface between the tailpiece and the sleeve as they are being assembled together as shown in FIG. 1A. Alternatively, the hose may be longer, initially, overlapping shoulder 105A and then cut when the sleeves are placed over the hose and the tailpiece. Some hose is trapped between set 106A of six interdigitated fingers and set 107I of interdigitated fingers along the part line 199P. This is because the inside diameter of the hose as shown in FIG. 2A is slightly larger than the largest diameter of hose gripping portion (portion to the left of shoulder 105A) of the tailpiece. When the hose is forced to conform to the waveforms of the sleeve 106, 107 and the exterior of the tailpiece 104 there is excess hose which is trapped in the part line 199P between sleeve halves 106, 107. Part line 199P forms a square wave such that excess hose is trapped both longitudinally and circumferentially. Differently shaped part lines may be used. Part line 199P prevents hose perforations when the collar halves 102, 103 urge the collar against the sleeve halves 106, 107. It will be noticed that the collars are arranged such that gap 108 therebetween is located approximately 90° from the part line 199P. FIG. 1 illustrates gap 108 between collar halves 102, 103 which is approximately 90° from the unnumbered joint between sleeve 106, 107.

Figure 2C:
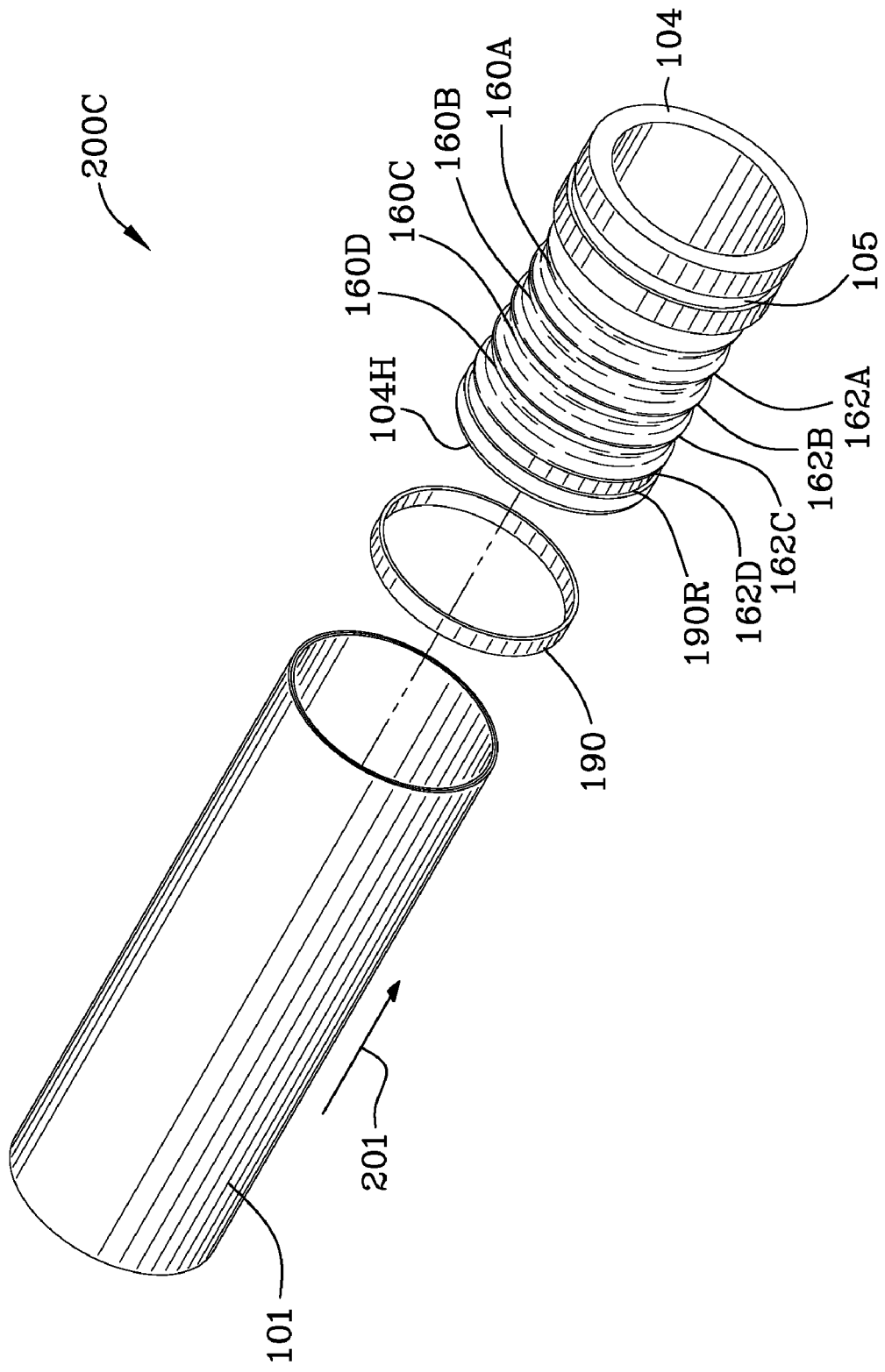
FIG. 2C is an exploded view of the hose positioned to be slid over a tail piece (without knurled portions).

FIG. 2C is an exploded view 200C of the hose positioned to be slid over a tail piece that does not have a knurled surface. Smaller hose diameters do not require a tail piece with knurled exterior surfaces. FIG. 2C illustrates a hose that does not have a metallic grounding wire embedded therein.

Figure 3:
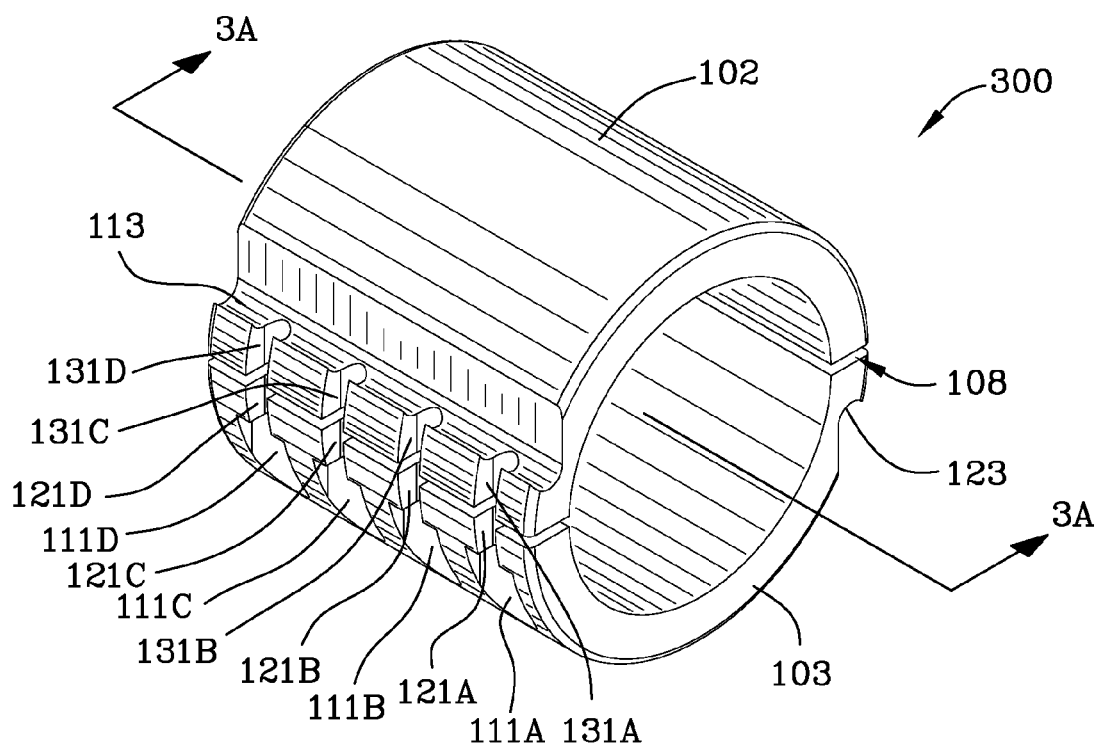
FIG. 3 is a perspective view of the two halves of the collar.
Figure 3A:
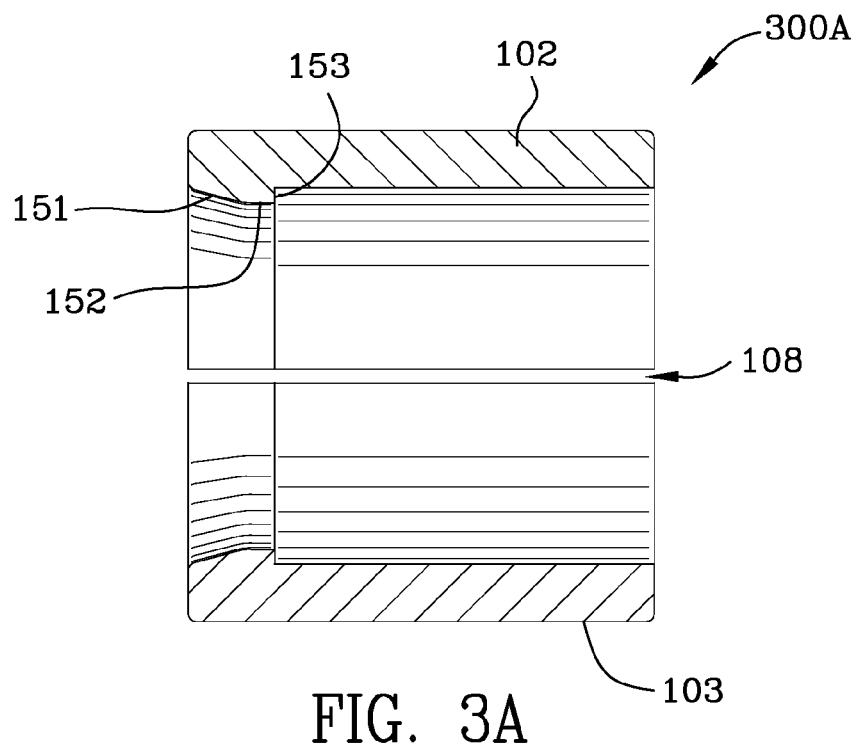
FIG. 3A is a cross-sectional view of the two halves of the collar taken along the lines 3A-3A of FIG. 3.
Figure 3B:
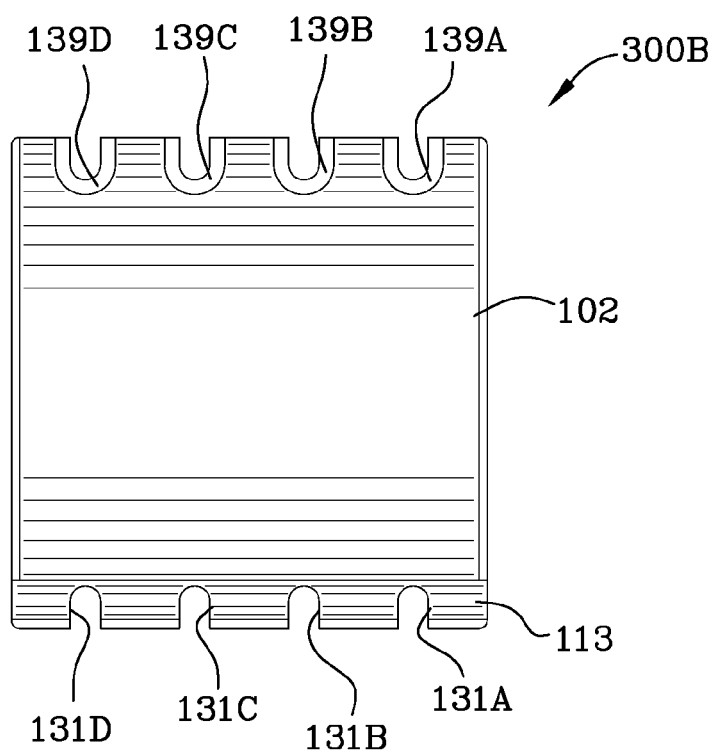
FIG. 3B is a top view of the collar.

FIG. 3A is a cross-sectional view 300A of the two halves 102, 103 of the collar taken along the lines 3A-3A of FIG. 3 illustrating the slope 151 and land 152 of the mouth of the collar. The slope is approximately 15°. J-shaped portions 113, 123 of the respective halves 102, 103 are illustrated. Seats 139A-D are illustrated in FIG. 3B. Bolts 129A-D engage seats 139A-D when the collar is in the clamping state or condition as illustrated in FIG. 1. See FIG. 3.

Referring to FIGS. 1B and 1H, the maximums of the sleeve 164A-D are spaced about 0.150 inches from the minimums of the tailpiece 160A-D. Similarly the minimums of the sleeve 166A-D are spaced about 0.150 inches from the maximums of the tailpiece 162A-D. Simply put, when the sleeve halves 106, 107 interengage each other as illustrated in FIG. 1A, and are tensioned as illustrated in FIG. 1, there is a gap of approximately 0.150 inches between the hose gripping portion of the tailpiece and the sleeves. The hose thickness is nominally greater than the gap thickness for the example illustrated in the drawing figures. The drawing figures depict an application for a nominal six inch diameter hose. Nominally the maximum peak to peak diameter of the tailpiece 104 shown in the figures is 6.05 inches (for example 162A-162A) and the nominal minimum valley to valley (for example 160A-160A) diameter is 5.65 inches which represents a sinusoidal exterior waveform having an amplitude of approximately 0.4 inches peak to valley. Similarly, the nominal maximum of the valley to valley diameter of the sleeves 106, 107 shown in the figures is 6.35 inches (for example 166A-166A) and the nominal peak to peak diameter is 5.95 inches (for example 164A-164A) which represents a sinusoidal interior waveform having an amplitude of approximately 0.4 inches peak to valley. The hose is compressed as illustrated in FIG. 1H within the sleeve 106, 107 and the tailpiece 104 and a portion of the hose is pinched between part line 199P. See FIG. 1A. When the sleeve is urged by the collar halves 103, 104 into the position illustrated schematically in FIG. 1A, the outside diameter of the sleeve 106, 107 is 6.90 inches. The inner diameter of the collar is 6.90 inches when the bolts are tightened within the pivot rods to achieve an approximate gap 108 of 0.25 inches. Sleeve 106, 107 is made of aluminum which prevents collar 102, 103 over-tightening.

Different hose sizes and differently dimensioned tailpieces, sleeves and collars may be used. The examples are given as ways to implement the invention and those skilled in the art will recognize that changes may be made without departing from the spirit and scope of the invention as claimed.

Figure 4:
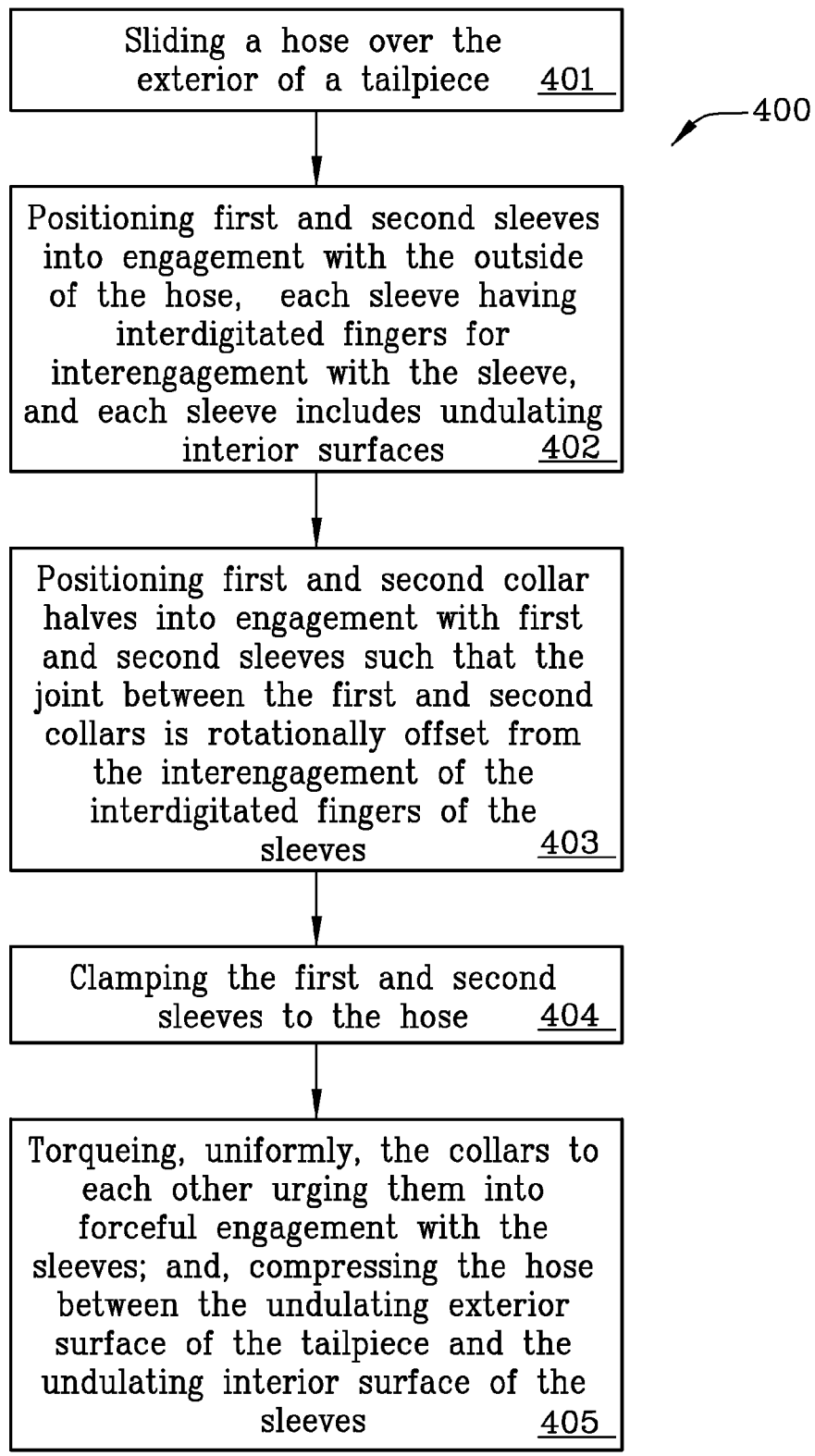
FIG. 4 is a schematic of the process steps for using the coupling.

FIG. 4 is a schematic 400 of the process steps for using the coupling. The steps include sliding a hose over the exterior of a tailpiece 401; positioning first and second sleeves into engagement with the exterior of the hose 402; each sleeve has fingers for interengagement with fingers from another half of the sleeve, and each sleeve includes undulating interior surfaces; positioning first and second collar halves into engagement with first and second sleeves such that the joint between the first and second collars is rotationally offset from the interengagment of the interdigitated fingers of the sleeves 403; clamping the first and second sleeves to the hose 404; torqueing, uniformly, the collars to each other urging them into forceful engagement with the sleeves, and, compressing the hose between the undulating exterior surface of the tailpiece and the undulating interior surface of the sleeves 405.

The method for coupling hose may accomplish clamping and torqueing with the use of pivot rods. The pivot rods reside in J-shaped slots in the exterior portions of the first and second collar halves. The pivot rods are threadedly interconnected with bolts secured within a respective one of the first and second collar halves. The J-shaped slots enable rotation of one of said first and second coupling halves with respect to the other enabling removal of the hose from the coupling for reuse thereof. Alternatively, instead of using the pivot rods the bolts may directly thread into the other half of the coupling.

REFERENCE NUMERALS

100—a front perspective view of the coupling and hose.
100A—an exploded assembly view of the hose and coupling illustrating the hose, tailpiece and sleeve
100B—a cross-sectional view of the coupling and hose of FIG. 1 taken along the lines 1B-1B of FIG. 1
100C—a cross-sectional view of the coupling and hose of FIG. 1 illustrating the grounding wire engaging the collar
100D—a perspective view of the tailpiece illustrating the exterior contour of the tailpiece and the diamond shaped knurl thereon
100E—a front view of the tailpiece
100F—a cross-sectional view of the tailpiece taken along the lines 1F-1F of FIG. 1E
100G—an enlarged portion of FIG. 1F illustrating the diamond shaped knurl on a portion of the surface of the tailpiece
100H—an enlargement of a portion of FIG. 1B illustrating the hose sandwiched between the tailpiece and one half of the sleeve the sleeve
101—hose
101M—grounding wire embedded in hose
102—first, top collar half
103—bottom collar half
104—tailpiece, coupling end
104H—tailpiece, hose end
105—mating groove for coupling end connection to another fitting, pump or truck
105A—shoulder which is abutted by hose material
106—first sleeve half
106A—set of six fingers of first sleeve half 106
106I—set of five fingers of first sleeve half 106
107—second sleeve half
107I—set of five fingers of second sleeve half 107
107A—set of six fingers of second sleeve 107 (interdigitated finger)
108—gap in collar
109A—threaded bolt
109B—threaded bolt
109C—threaded bolt
109D—threaded bolt
110—encased grounding wire
111A—bolt head well
111B—bolt head well
111C—bolt head well
111D—bolt head well
112—threaded pivot rod
113—J-shaped pivot rod seat in first, top collar
121A—passageway for bolt in second, bottom collar
121B—passageway for bolt in second, bottom collar
121C—passageway for bolt in second, bottom collar
121D—passageway for bolt in second, bottom collar
123—J-shaped pivot rod seat
129A—threaded bolt
129B—threaded bolt
129C—threaded bolt
129D—threaded bolt
131A—passageway for bolt in first, top collar
131B—passageway for bolt in first, top collar
131C—passageway for bolt in first, top collar
131D—passageway for bolt in first, top collar
132—threaded pivot rod
150—end of collar
151—sloped hose inlet of collar
152—land in inlet of collar
153—shoulder of collar
160A—valley (low point) of the sinusoidal waveform of the exterior of the tailpiece
160B—valley (low point) of the sinusoidal waveform of the exterior of the tailpiece
160C—valley (low point) of the sinusoidal waveform of the exterior of the tailpiece
160D—valley (low point) of the sinusoidal waveform of the exterior of the tailpiece
162A—peak (high point) of the sinusoidal waveform of the exterior of the tailpiece
162B—peak (high point) of the sinusoidal waveform of the exterior of the tailpiece
162C—peak (high point) of the sinusoidal waveform of the exterior of the tailpiece
162D—peak (high point) of the sinusoidal waveform of the exterior of the tailpiece
164A—peak (high point) of the sinusoidal waveform of the interior of second sleeve 164B—peak (high point) of the sinusoidal waveform of the interior of second sleeve
164C—peak (high point) of the sinusoidal waveform of the interior of second sleeve
164D—peak (high point) of the sinusoidal waveform of the interior of second sleeve
166A—valley (low point) of the sinusoidal waveform of the interior of the second sleeve tailpiece
166B—valley (low point) of the sinusoidal waveform of the interior of the second sleeve tailpiece
166C—valley (low point) of the sinusoidal waveform of the interior of the second sleeve tailpiece
172A—diamond shaped knurled portion of the sinusoidal waveform on the exterior of the tailpiece
172B—diamond shaped knurled portion of the sinusoidal waveform on the exterior of the tailpiece
172C—diamond shaped knurled portion of the sinusoidal waveform on the exterior of the tailpiece
172D—diamond shaped knurled portion of the sinusoidal waveform on the exterior of the tailpiece
178A—starting place of the diamond shaped knurled portion of the sinusoidal waveform on the exterior of the tailpiece
178B—starting place of the diamond shaped knurled portion of the sinusoidal waveform on the exterior of the tailpiece
178C—starting place of the diamond shaped knurled portion of the sinusoidal waveform on the exterior of the tailpiece
178D—starting place of the diamond shaped knurled portion of the sinusoidal waveform on the exterior of the tailpiece
190—recess for seal 190
190R—recess for seal 190
199P—zig-zag parting line between interdigitated fingers of each sleeve
200—an exploded view of the hose positioned to be slid over the tail piece
201—arrow indicating the direction of movement of the hose
200A—an exploded view of the hose residing over the coupling 104
200B—a cross-sectional view of one-half of the sleeve taken along the lines 2B-2B of FIG. 2A
200C—hose positioned to be slid over a tailpiece which is not knurled
300—a perspective view of the two halves of the collar
300A—a cross-sectional view of the two halves of the collar taken along the lines 3A-3A of FIG. 3
300B—a top view of the collar
400—schematic of process steps for using the coupling
401—sliding a hose over the exterior of a tailpiece
402—positioning first and second sleeves into engagement with the outside of the hose, each sleeve having interdigitated fingers for interengagement with the sleeve, and each sleeve includes undulating interior surfaces
403—positioning first and second collar halves into engagement with first and second sleeves such that the joint between the first and second collars is rotationally offset from the interengagment of the interdigitated fingers of the sleeves
404—clamping the first and second sleeves to the hose
405—torqueing, uniformly, the collars to each other urging them into forceful engagement with the sleeves; and, compressing the hose between the undulating exterior surface of the tailpiece and the undulating interior surface of the sleeves Those skilled in the art will realize that the invention has been set forth by way of example only and that changes may be made to the examples shown herein without departing from the spirit and the scope of the claims which have been appended hereto.

The invention claimed is:

1. A hose coupling, comprising:
    a tailpiece, said tailpiece includes a first undulating contour, said first undulating contour of said tailpiece is sinusoidally shaped and, said tailpiece includes a shoulder;
    a collar, said collar includes a shoulder;
    a stationary sleeve, said stationary sleeve engages said shoulder of said tailpiece and said stationary sleeve engages said shoulder of said collar, said stationary sleeve trapped between said shoulder of said tailpiece and said shoulder of said collar;
    a hose disposed between said stationary sleeve and said tailpiece;
    said stationary sleeve includes a second undulating contour reciprocal to said first undulating contour of said tailpiece; and,
    said collar locking said stationary sleeve and said hose against said contour of said tailpiece preventing extraction of said hose from said coupling.

2. A hose coupling as claimed in claim 1 wherein said second undulating contour of said stationary sleeve is sinusoidally shaped.

3. A hose coupling as claimed in claim 1 wherein said first undulating contour of said tailpiece includes knurled portions.

4. A hose coupling as claimed in claim 1 wherein said first undulating contour of said tailpiece includes first peaks and first valleys and said second undulating contour of said stationary sleeve includes second peaks and second valleys, said first peaks of said tailpiece interfitting said second valleys of said sleeve and said first valleys of said tailpiece interfitting said second peaks of said sleeve.

5. A hose coupling as claimed in claim 1 wherein:
    said tailpiece includes an exterior first undulating contour and a cylindrically shaped interior; and,
    said stationary sleeve includes an interior second undulating contour and a cylindrically shaped exterior.

6. A hose coupling as claimed in claim 1 wherein said stationary sleeve includes first and second halves and each of said halves includes two sets of reciprocal fingers which interengage each other forming a cylindrically shaped exterior.

7. A hose coupling as claimed in claim 6 further wherein said collar includes first and second halves, said halves of said collar are joined and are not aligned with said fingers of said halves of said stationary sleeve.

8. A hose coupling as claimed in claim 7 further comprising elongated screws and pivot bars, said halves of said collar include passageways therethrough, and, said screws interengage said pivot bars.

9. A hose coupling as claimed in claim 1 wherein said collar includes first and second halves, and each of said halves of said collar interengage said stationary sleeve.

10. A hose coupling as claimed in claim 9 wherein said first and second halves of each collar include an interior portion and an exterior portion, said interior portions include a shoulder therein.

11. A hose coupling as claimed in claim 10 wherein said first and second halves of said stationary sleeve abut said shoulder in said interior portions of said halves of said collar.

12. A hose coupling as claimed in claim 1 wherein said hose further includes a grounding wire and said grounding wire engages one of said halves of said collar.

13. A hose coupling as claimed in claim 1 wherein said hose is compressed between said tailpiece and said stationary sleeve, said stationary sleeve comprises first and second halves, said undulations of said first contour of said tail piece and said undulations of said second contour of said stationary sleeve being smooth so as to prevent tearing of said hose.

14. A hose coupling as claimed in claim 1 wherein said stationary sleeve comprises first and second halves, said first half of said stationary sleeve includes interdigitated fingers and second half of said stationary sleeve includes interdigitated fingers, said first and second set of interdigitated fingers are interlaced with one another forming a non-linear parting line between said first and second halves of said stationary sleeve having said first and second half of interdigitated fingers.

15. A hose coupling as claimed in claim 14 wherein said stationary sleeve compresses said hose in variable directions along said non-linear parting line and minimizes pinching of said hose when said collar urges said stationary sleeve inwardly.

16. A hose coupling, comprising:
a tailpiece, said tailpiece includes a first shoulder;
a collar, said collar includes a second shoulder;
a stationary sleeve, said stationary sleeve engages said first shoulder of said tailpiece and said stationary sleeve engages said second shoulder of said collar, said stationary sleeve trapped between said first shoulder of said tailpiece and said second shoulder of said collar;
said tailpiece includes an exterior, first sinusoidally shaped contour;
said tailpiece includes a cylindrically shaped interior;
said exterior, first sinusoidally shaped contour includes knurled portions;
said stationary sleeve includes an interior, second sinusoidally shaped contour reciprocal to said first sinusoidally shaped contour of said exterior of said tailpiece;
said stationary sleeve includes first and second halves;
each half of said stationary sleeve includes two sets of reciprocal fingers;
each set of reciprocal fingers of said first half of said stationary sleeve engage a respective interfitting set of said reciprocal fingers of said second half of said stationary sleeve forming a non-linear parting line;
said exterior, sinusoidally shaped contour of said tailpiece includes first peaks and first valleys and said second interior, sinsusoidally shaped contour of said stationary sleeve includes second peaks and second valleys;
a hose disposed between said stationary sleeve and said tailpiece;
said first peaks of said tail piece interfitting said second valleys of said stationary sleeve and said first valleys of said tailpiece interfitting said second peaks of said stationary sleeve;
said collar includes first and second halves;
each of said halves of said collar interengage said stationary sleeve;
said collar locking said stationary sleeve against said hose;
said hose engaging said first sinusoidally shaped contour of said exterior of said tailpiece and said knurled portions of said first sinusoidally shaped contour of said exterior of said tailpiece preventing extraction of said hose from said coupling.

17. A hose coupling as claimed in claim 16 wherein said hose is compressed between said tailpiece and said stationary sleeve.

18. A hose coupling as claimed in claim 17 wherein said stationary sleeve compresses said hose in variable directions along said non-linear parting line and minimizes pinching of said hose when said collar locks said stationary sleeve inwardly.

19. A hose coupling, comprising:
a tailpiece, said tailpiece includes a first undulating contour, and, said tailpiece includes a first shoulder;
a collar, said collar includes a second shoulder;
a stationary sleeve, said stationary sleeve engages said first shoulder of said tailpiece and said sleeve engages said second shoulder of said collar, said stationary sleeve trapped between said shoulder of said tailpiece and said shoulder of said collar;
a hose disposed between said stationary sleeve and said tailpiece;
said stationary sleeve includes a second undulating contour reciprocal to said first undulating contour of said tailpiece; said stationary sleeve comprises first and second halves; said stationary sleeve halves include reciprocal interdigitated fingers which form a non-linear parting line; and,
said collar locking said stationary sleeve and said hose against said contour of said tailpiece preventing extraction of said hose from said coupling.

20. A hose coupling as claimed in claim 19 wherein said non-linear linear parting line is in the shape of a non-linear wave.

21. A method for coupling hose, comprising the steps of:
drawing hose over the exterior of a tailpiece, said tailpiece includes an undulating exterior surface and a first shoulder;
placing first and second stationary sleeves on the outside of said hose, said stationary sleeves each having interdigitated fingers for interengagement with each other, and said stationary sleeves include undulating interior surfaces;
placing first and second collar halves, said first and second collar halves each having a second shoulder, over said first and second stationary sleeves such that the joint between said first and second collars is rotationally offset from said interengagement of said interdigitated fingers of said stationary sleeves;
locking, using said first shoulder of said tailpiece and said second shoulders of said first and second collar halves, said first and second stationary sleeves with respect to said tailpiece and said first and second collar halves;
locking said first and second stationary sleeves to said hose;
torqueing, uniformly, said first and second collar halves to each other urging them into forceful engagement with said stationary sleeves; and,
compressing said hose between said undulating exterior surface of said tailpiece and said undulating interior surface of said stationary sleeves.

22. A method for coupling hose as claimed in claim 21 wherein said exterior of said tailpiece includes knurled portions thereof.

23. A method for coupling hose as claimed in claim 21 wherein said steps of locking and torqueing are performed with pivot rods, said pivot rods resides in J-shaped slots in said exterior portions of said first and second collar halves, said pivot rods are threadedly interconnected with bolts secured within a respective one of said first and second collar halves.

24. A method for coupling hose as claimed in claim 23 wherein said J-shaped slots enable rotation of one of said first and second coupling halves with respect to the other enabling removal of the hose from the coupling for reuse thereof.

25. A method for coupling hose, comprising the steps of:
drawing hose over the exterior of a tailpiece, said tailpiece includes an undulating exterior surface and a first shoulder;
placing first and second stationary sleeves on the outside of said hose, said stationary sleeves each having interdigitated fingers for interengagement with each other, and said stationary sleeves include undulating interior surfaces;
placing first and second collar halves, said first and second collar halves each having a second shoulder, over said first and second stationary sleeves such that the joint between said first and second collars is rotationally offset from said interengagement of said interdigitated fingers of said stationary sleeves;
locking, using said first shoulder of said tailpiece and said second shoulders of said first and second collar halves, said first and second stationary sleeves with respect to said tailpiece and said first and second collar halves;
locking said first and second stationary sleeves to said hose and torqueing, uniform said first and second collar halves to each other urging them into forceful engagement with said stationary sleeves, said steps of locking and torqueing are performed with pivot rods, said pivot rods reside in J-shaped slots in said exterior portions of said first and second collar halves, said pivot rods include threaded openings therein which interengage and receive threaded bolts secured within a respective one of said first and second collar halves; and,
compressing said hose between said undulating exterior surface of said tailpiece and said undulating interior surface of said stationary sleeves.

26. A method for coupling hose as claimed claim 25 wherein said J-shaped slots enable rotation of one of said first and second coupling halves with respect to the other enabling removal of the hose from the coupling for reuse thereof.

* * * * *

UNITED STATES PATENT AND TRADEMARK OFFICE
CERTIFICATE OF CORRECTION

| | | |
|---|---|---|
| PATENT NO. | : 8,047,577 B2 | Page 1 of 1 |
| APPLICATION NO. | : 12/258772 | |
| DATED | : November 1, 2011 | |
| INVENTOR(S) | : Dennis Zeiber | |

It is certified that error appears in the above-identified patent and that said Letters Patent is hereby corrected as shown below:

Col. 14, line 23, after the first occurrence of "non-linear", delete "linear".

Col. 16, line 2, after the "torqueing," delete "uniform" and insert -- uniformly --.

Col. 16, line 14, after "claimed" insert -- in --.

Signed and Sealed this

Twentieth Day of December, 2011

David J. Kappos
*Director of the United States Patent and Trademark Office*